United States Patent [19]

Parks

[11] Patent Number: 4,771,276
[45] Date of Patent: Sep. 13, 1988

[54] ELECTROMAGNETIC TOUCH SENSOR INPUT SYSTEM IN A CATHODE RAY TUBE DISPLAY DEVICE

[75] Inventor: Terry J. Parks, Miami, Fla.

[73] Assignee: International Business Machines Corporation, Armonk, N.Y.

[21] Appl. No.: 723,129

[22] Filed: Apr. 15, 1985

[51] Int. Cl.⁴ .............................................. G09G 1/00
[52] U.S. Cl. ..................................... 340/712; 178/18
[58] Field of Search .................... 340/712, 706, 365 C, 340/365 R; 178/18, 17 C

[56] References Cited

U.S. PATENT DOCUMENTS

| | | | |
|---|---|---|---|
| 4,110,749 | 8/1978 | Janko et al. | 340/365 C |
| 4,281,323 | 7/1981 | Burnett et al. | 340/365 C |
| 4,291,303 | 9/1981 | Cutler | 340/712 |
| 4,386,232 | 5/1983 | Slater | 340/712 |
| 4,476,463 | 10/1984 | Ng et al. | 340/712 |
| 4,517,559 | 5/1985 | Deitch et al. | 340/712 |

Primary Examiner—John W. Caldwell, Sr.
Assistant Examiner—Mahmoud Fatahi-Yar
Attorney, Agent, or Firm—Robert Lieber

[57] ABSTRACT

A cathode ray tube display device has conductive plates mounted adjacent the four sides of the CRT faceplate. These plates are positioned to sense electromagnetic noise radiation generated by the CRT. The plates are coupled to differential circuits so that normally the noise signals generated in the plates cancel. However when a finger or other object is placed at or near the CRT faceplate, the noise radiation field is disturbed, and the changed signals generated in the plates are sensed by the circuits to provide output signals indicative of the coordinate position of the object at the faceplate. The plates are preferably mounted in the front bezel of the display cabinet.

8 Claims, 3 Drawing Sheets

ELECTROMAGNETIC TOUCH SENSOR INPUT SYSTEM IN A CATHODE RAY TUBE DISPLAY DEVICE

TECHNICAL FIELD

The present invention relates to cathod ray tube display systems, and in particular to such systems employing touch sensor inputs.

BACKGROUND TO THE INVENTION

Many systems have been proposed to provide operator's inputs in a cathode ray tube display system by providing, at the cathode ray tube screen face, an arrangement sensitive to an operator positioning an object or his finger on the face.

Probably the most well known of such devices is the light pen. This is a light sensitive device which, when placed on a cathode ray tube face, detects the light generated by the cathode ray tube beam as it sweeps past the pen. The position of the pen on the screen can be calculated by reference to the timing of the cathode ray tube beam sweeping. The main disadvantages of the light pen are that it has to be coupled to the display system by a flying lead connector which can prove awkward in use and that it has to be robustly constructed to prevent damage due to dropping.

In order to overcome the disadvantages of the light pen, there have been a number of proposals to provde interactive cathode ray tube inputs by contacting the cathode ray tube face. An article entitled 'Touch Sensitive CRT Screens Join Computers and Nonusers' in Electronic Design, Volume 29, No. 21, Oct. 15, 1981 at pages 61, 62 and 64 summarizes such systems. There may be divided into two general groups, passive devices and active sensory devices.

The passive devices comprise matrices of resistive capacitive elements formed on membranes which are fixed to the face of a cathode ray tube, or circuit elements fixed directly to the face. With the resistive devices, touching a resistive membrane signals the position of the touch by contact between normally spaced resistive surfaces at the touch area via a voltage divider effect. With the capacitive devices, touching one of a pattern of pads on the cathode ray tube face adds the human body's capacitance to that pad, and a circuit detects the change and signals the position of the touched pad. U.S. Pat. No. 3,482,241 shows one form the circuitry used to sense capacitive touch pads. One problem with these passive devices is that they obscure or reduce the brilliance of areas of the cathode ray tube screen.

To avoid this problem, the active devices were developed. As indicated in the above mentioned Electronic Design article, these devices flood the screen with acoustic or light signals. With the acoustic system, piezoelectric transducers positioned adjacent the screen produced acoustic surface waves across the screen. These are reflected by any object touching the screen face and the reflected signals are sensed by the transducers to provide an indication of the position of the object. The optic systems use an array of L.E.D.'s at one side of the screen which generate light beams which are sensed by photo diodes at the opposite side of the screen. In these systems, breaking of the light beams by touching the cathode ray tube face is sensed to provide an indication of the touch position. These active systems are relatively expensive and are subject to ambient signal interference, though steps can be taken to minimize such interference.

U.S. Pat. No. 4,281,323 shows a display touch sensing system which uses ambient electrical noise generated by the display device. In that system, conductive strips are arranged in rows and columns across the face of a display device. In operation of the display device, electrical noise is generated constantly in the strips. When an operator places his finger at the conjunction of a row and a line strip, the amplitude of the noise on these strips changes. This change is sensed to provide an indication of the position of the touch. This system, as it employs lines and pads on the screen face, has the same disadvantage as that of the passive devices described above.

DISCLOSURE OF THE INVENTION

The present invention is based on the discovery that electromagnetic noise generated by a cathode ray tube can be used to sense a touch position on the face of the tube without the use of any sensor devices on the viewable face of the tube.

According to the invention there is provided an electromagnetic touch sensor input system in a cathode ray tube display device comprising first and second elongated conductors respectively positioned along the side edges of the faceplate of the cathode ray tube, third and fourth elognated conductors positioned respectively adjacent the upper and lower edges of the faceplate, said conductors being arranged to pick up electromagnetic noise generated by the cathode ray tube in operation, first circuit means coupled to the first and second conductors and second circuit means coupled to the third and fourth conductors, said circuit means being responsive to electromagnetic noise signals induced in the conductors to provide output signals representative of the location at the cathode ray tube face of an object positioned on or adjacent said face and interfering with said electromagnetic noise.

DETAILED DESCRIPTION

Figure 1:
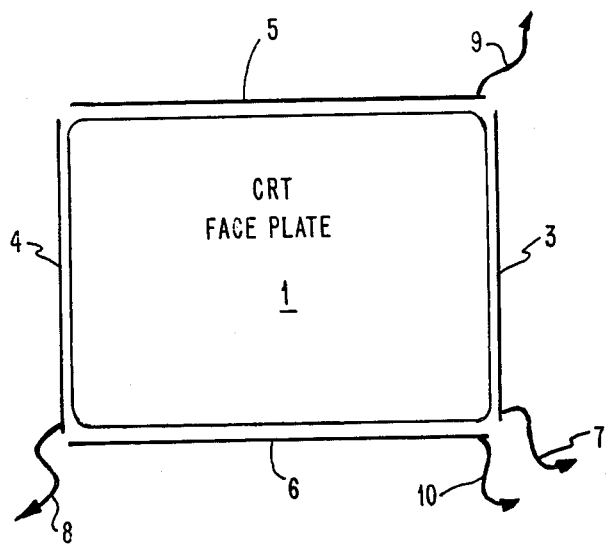
FIG. 1 is a schematic diagram of the front face of a cathode ray tube with sensing conductors positioned along each side.
Figure 2:
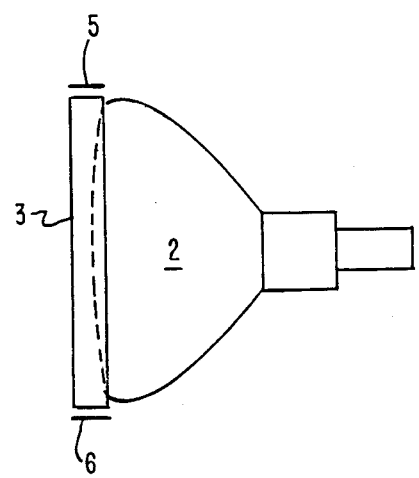
FIG. 2 is a side view of the FIG. 1 arrangement.

FIGS. 1 and 2 show the arrangement of touch sensor plates around the periphery of the faceplate 1 of a CRT 2 used in a display terminal. Plates 3 and 4 are positioned along the sides of the faceplate, and plates 5 and 6 are positioned at the upper and lower edges of the faceplate. A pair of leads 7 and 8 are coupled respectively to the lower ends of plates 3 and 4, and a further pair of leads 9 and 10 are coupled respectively to the right-hand ends of plates 5 and 6. Each plate has a length which corresponds substantially with the length of the adjacent side of the CRT faceplate and, as can be seen in FIG. 2, a width which allows it to extend in front of the faceplate. As will be seen later in the description of the FIG. 4 arrangement, the plates are conveniently mounted in the front bezel of a cabinet into which the CRT faceplate fits. The width of each plate is the maximum width that can be accommodated within the bezel.

It will be noted that the four plates are mounted to extend beyond the front surface of CRT faceplate 1. In this position, they act as antenna to pick up electromagnetic noise generated by the CRT when it is operated to form a displayed image on the faceplate. In particular, the electromagnetic noise generated by the field created by the E.H.T. supply (extremely high tension or voltage) to the CRT anode is sensed. This radiation is at a frequency equal to the ripple frequency of the EHT supply. If this supply is generated by the line flyback of the vertical timelane generator in the display unit, then, for a raster scan display system using the NTSC standard, this frequency will be 15 KHZ. If another type of RF EHT generator is used, then the frequency of that generator will be that causing the noise picked up by the plates. As will be seen later, any other noise picked by the plates can be filtered out by sensing circuits coupled to the plates, and will not, therefore, affect the operation of the system.

The object of the system is, of course, to determine the position of a finger, or any other conducting object positioned on the display area of the CRT faceplate. In the absence of such an object, the noise sensed by each plate in a pair (in plates 3 and 4 and plates 5 and 6) is substantially equal. When a finger or other object contacts the screen, it disturbs the electromagnetic noise field and therefore changes the induced voltages on the plates. These changes are then sensed and used to generate signals indicating the position of the object relative to the four plates.

Figure 3:
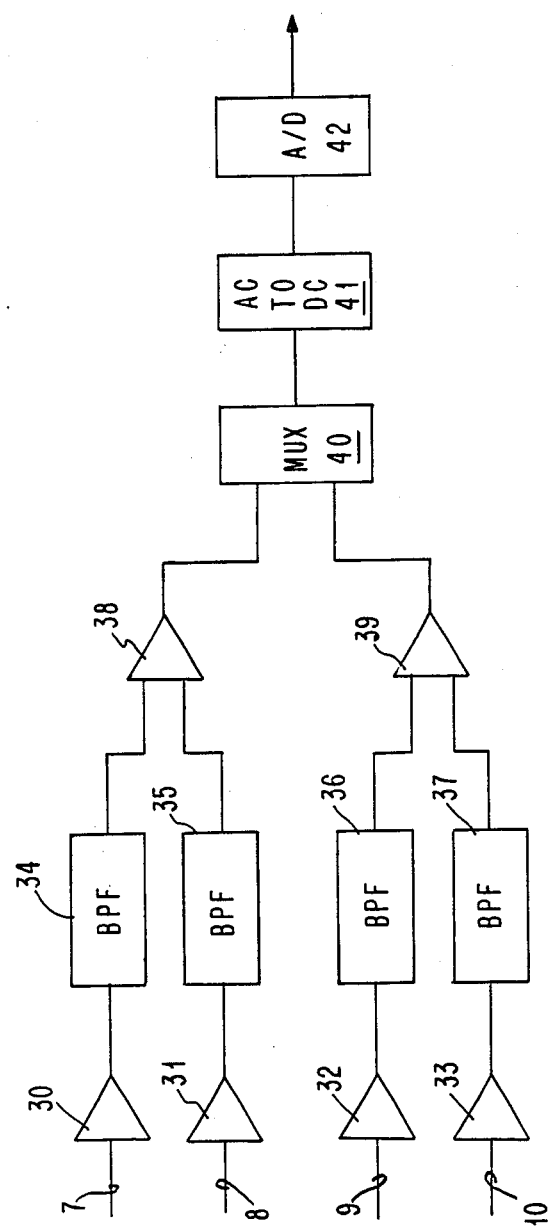
FIG. 3 is a block diagram of sensor circuits coupled to the sensing conductors of FIG. 1.

FIG. 3 shows the sensing circuits which are coupled to receive the signals induced in the plates. In this figure, lines 7 and 8, coupled respectively from plates 3 and 4, are applied through buffer amplifiers 30 and 31 to bandpass filters 34 and 35. These bandpass filters have a narrow passband centered about the ripple frequency of the CRT E.H.T. supply, so that other noise picked up on plates 3 and 4 is filtered out. The bandpass filter outputs are applied as respective inputs to a differential amplifier 38. This is arranged to provide a zero output when both plates are generating the same output signal, i.e. when no object touches faceplate 1 of the CRT. Any inherent variations in the signals on plates 3 and 4 can, of course, be corrected by adjusting the gain of one of the buffer amplifiers 30 and 31, or the balance of differential amplifier 38. Now, whenever an object is placed on the CRT faceplate, different amplitude signals are induced in plates 3 and 4 and appear over lines 7 and 8. After amplification and filtering, these generate different outputs from differential amplifiers 38, the output of this amplifier varying in accordance with the relative position of the object between plates 3 and 4. In a similar way, either a zero output or different varying outputs are generated by a differential amplifier 39. This receives, as its inputs, the signals from plate 5 over line 9 amplified by buffer amplifier 32 and filtered by bandpass filter 36, and from plate 6 over line 10 amplified by buffer amplifier 30 and filtered by bandpass filter 37. Amplifiers 32 and 33 and filters 36 and 37 are identical to the corresponding components in the plate 3 and 4 sensing circuit.

The outputs of differential amplifiers 38 and 39 are AC signals at the bandpass frequency having amplitudes representing respectively the x and y co-ordinate positions of an object, if any, touching the CRT faceplate. These outputs are applied to an analog multiplexer 40, which is responsive to a control signal (not shown) to switch between the outputs of the differential amplifiers. The multiplexer outputs are fed to peak AC to DC converter 41, the output of which is converted to digital signals by analog-to-digital converter 42. Thus, digital representations of the x and y coordinates of the object are generated alternately. These are applied to a microprocessor coupled to the display unit to provide interactive position feedback.

Figure 4:
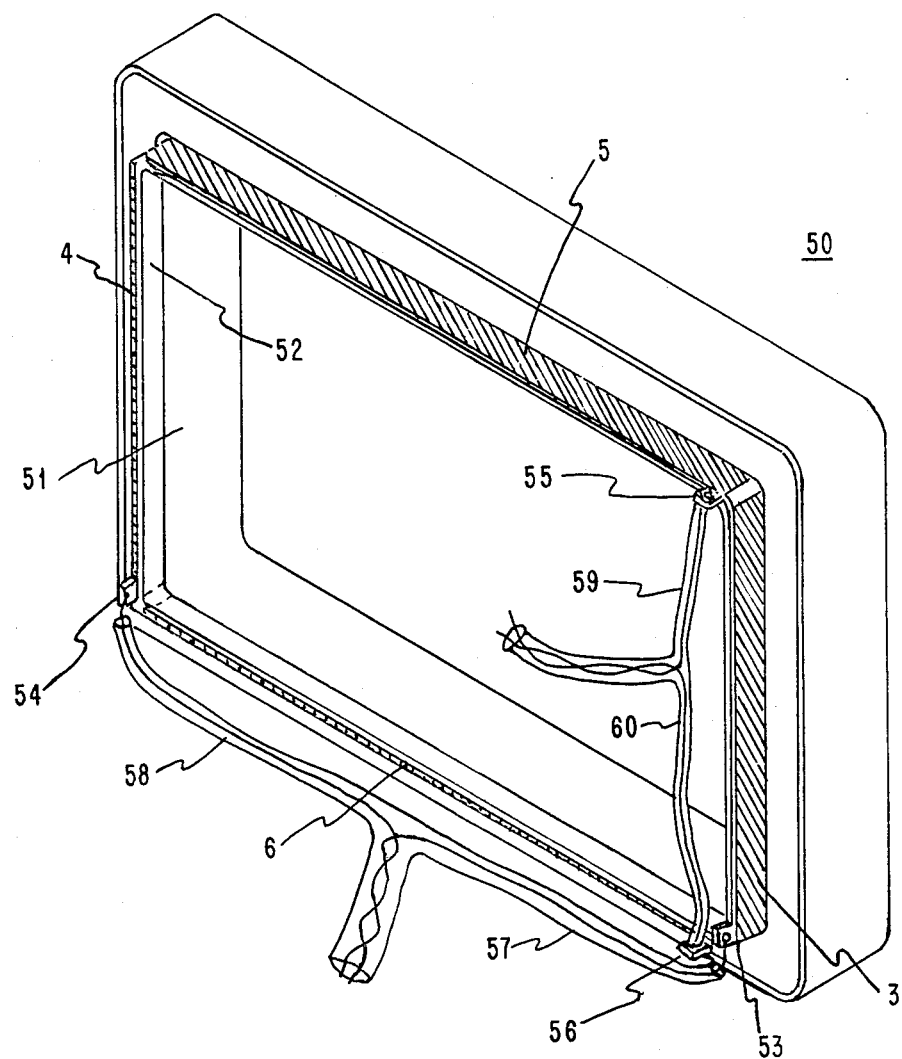
FIG. 4 is a perspective view showing details of a practical implementation of the arrangement shown in FIGS. 1 and 2.

FIG. 4 is a perspective view of a practical configuration of the sensor plate system, in which the plates are mounted in a cabinet bezel which accepts the CRT face. In detail, the bezel 50 includes a front section 51 against which the front face of a CRT locates. Integrally molded into the bezel are the four plates 3 through 6, these being molded into an insulated support 52 into which the sides of the CRT faceplate fit. Each plate includes a connector tab, 53 through 56 respectively, for connection to the sensor circuits. These connections are made firstly by shielded wires (57 through 60) from each tab and, from the end of each shielded wire, by shielded twisted pairs as shown. In order to minimize the effect of ambient interfering signals, the length of each of the shielded wires 57 through 60 is made as short as possible. Thereafter, the length and routing of the shielded twisted pairs is not critical.

It is, of course, clear that the depth of the bezel may be such that the plates could be fully molded therein, with just the connection tabs exposed. Alternatively, a plate assembly, with the plates mounted on a rectangular support, could be fitted into a rectangular slot in the bezel. In another arrangement, the plates could be fitted into four separate slots in the bezel.

While the invention has been shown and disclosed with reference to particular embodiments, it will be understood by those skilled in the art that various other changes in form and detail may be made without departing from the spirit and scope of the invention.

I claim:

1. An electromagnetic touch sensor input system in a display device including a cathode ray tube having a rectangular faceplate, said system including first and second elongated conductors positioned adjacent and along respective side edges of said faceplate, third and fourth elongated conductors positioned adjacent and along upper and lower edges of said faceplate respectively, said conductors surrounding an overlay-free viewing area on said faceplate, first differential amplifier means having inputs coupled respectively to said first and second conductors, and second differential amplifier means having inputs coupled respectively to said third and fourth conductors, said amplifier means generating output signals representing differential electromagnetic noise signals induced in the respectively connected conductors by the cathode ray tube, whereby said amplifier means provide output signals indicating the coordinate location of an object touching or immediately adjacent the faceplate and differentially altering the pattern of said electromagnetic noise signals.

2. A touch sensor input system according to claim 1 in which the display device includes a front bezel arranged to locate said faceplate and define a viewable opening for the faceplate, and in which said conductors are mounted within the bezel round said faceplate.

3. A touch sensor input system according to claim 1 in which each conductor is in the form of a strip having a width extending forwardly of said faceplate.

4. A touch sensor input system according to claim 2 in which each conductor is in the form of a strip having a width extending forwardly of said faceplate.

5. A touch sensor input system according to claim 1 in which the first and second amplifier means each include bandpass filter means having a narrow pass band at the frequency of the E.H.T. generator supplying the cathode ray tube, whereby each circuit is responsive only to electromagnetic noise generated by the cathode ray tube at the E.H.T. ripple frequency.

6. A touch sensor input system according to claim 1 in which the differential amplifier outputs are applied to a multiplexer operative to switch cyclically between these outputs, and including analog-to-digital converter means coupled to the output of the multiplexer to provide digital representations of respective x coordinate and y coordinate positions of said object at the faceplate surface.

7. A touch sensor input system according to claim 1 in which the first and second amplifier means are coupled to the conductors through leads connected to one end of each conductor.

8. A touch sensor input system according to claim 7 in which each pair of leads connected to each amplifier means is coupled to corresponding coordinate ends of the associated conductors.

* * * * *